May 13, 1969 P. J. H. JANSSEN 3,444,452

HIGH VOLTAGE RECTIFIER ARRAY INCLUDING A NEUTRALIZING CONDUCTOR

Filed Feb. 3, 1964 Sheet 1 of 2

INVENTOR.
PETER J.H. JANSSEN
BY
Frank R. Trifari
AGENT

INVENTOR.
PETER J.H. JANSSEN
BY
Frank R. Trifari
AGENT

United States Patent Office 3,444,452

Patented May 13, 1969

3,444,452

HIGH VOLTAGE RECTIFIER ARRAY INCLUDING A NEUTRALIZING CONDUCTOR

Peter Johannes Hubertus Janssen, Emmasingel, Eindhoven, Netherlands, assignor to North American Philips Company, Inc., New York, N.Y., a corporation of Delaware

Filed Feb. 3, 1964, Ser. No. 342,166
Claims priority, application Netherlands, Feb. 8, 1963, 288,761
Int. Cl. H02m *1/18, 7/00;* H01l *3/00*
U.S. Cl. 321—11 9 Claims

This invention relates to high voltage rectifiers and more particularly to a high voltage rectifier comprising a plurality of semiconductor rectifier elements connected in series between an input electrode and an output electrode, and means for compensating for the unequal voltage distribution appearing across the rectifier elements.

As is well-known, for rectifying alternating voltages use may be made of semiconductor elements, for example, silicon cells or selenium cells. Since such semiconductor elements can resist only a comparatively low voltage, the rectification of high alternating voltages requires that a large number of semiconductor elements be connected in series. Thus, for example, for producing the high accelerating voltage (15 kilovolts) for the final anode of a television display tube, use is made of a rectifier which is built up of approximately 500 semiconductor elements.

However, it has been found that in such rectifiers composed of a large number of rectifying elements, a comparatively large proportion of the alternating voltage to be rectified is developed across the elements located near the input electrode, whereas substantially no voltage occurs across the elements located at the other end, i.e. near the output electrode. Besides, it also was found that the great voltage drop across the elements located near the input electrode could not be reduced to any appreciable extent by means of a further increase in the number of rectifier elements of the high voltage rectifier.

It will be evident that, due to the above-mentioned phenomenon, on the one hand the elements located near the input electrode are overloaded and, on the other hand, the elements located near the output electrode are substantially useless. An object of the invention is to provide means for improving the voltage distribution along the rectifier and, to this end, the high voltage rectifier according to the invention is characterized in that it comprises a neutralizing conductor and means for applying the alternating voltage to be rectified to the neutralizing conductor in such a manner that the parasitic capacitances of the semiconductor elements are neutralized, at least substantially, by the capacitances of the semiconductor elements relative to the neutralizing conductor.

In order that the invention may be readily carried into effect, it will now be described in detail, by way of example, with reference to the accompanying dliagrammatic drawings, in which.

Figure 4:
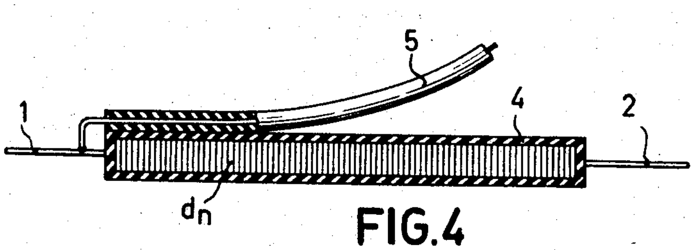
Figures 5A, 5B:
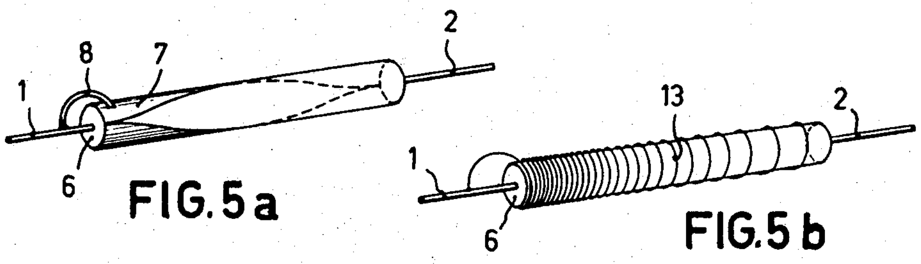
Figure 6A:
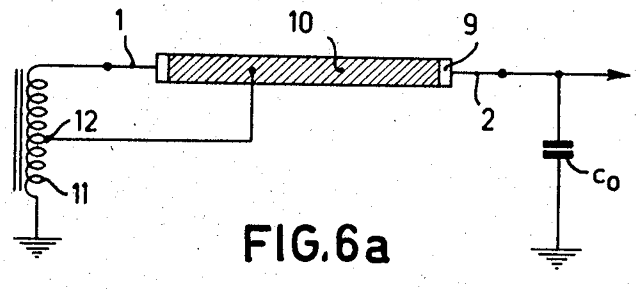
Figure 6B:
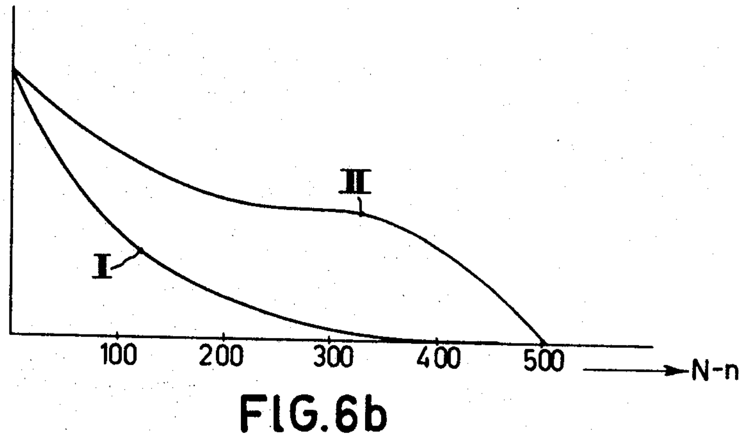

FIGURES 4, 5*a* and 5*b* show a first, second and third embodiment, respectively, of a high voltage rectifier provided with a neutralizing conductor according to the invention, and FIGURES 6*a* and 6*b* show respectively a fourth embodiment of a high voltage rectifier provided with a neutralizing conductor according to the invention and the voltage variation across this rectifier.

Figure 1:
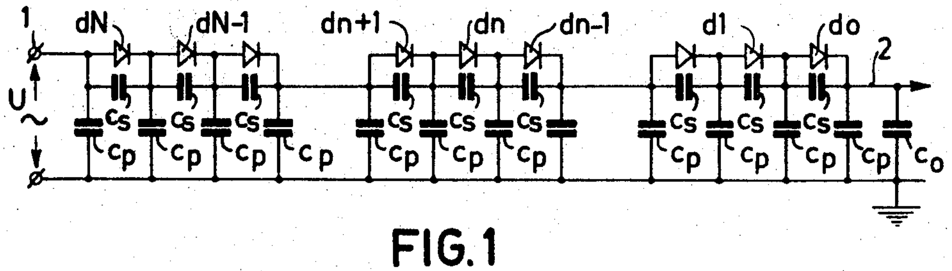
FIGURE 1 shows the equivalent diagram of a known high voltage rectifier.

FIGURE 1 shows the equivalent diagram of a rectifier built up of a large number (N) of semiconductor rectifier elements connected in series. Each element is represented by a diode ($d_0 \ldots d_N$) which is bridged by a diode capacitance $C_s$. An alternating voltage to be rectified is applied between an input electrode 1 of the rectifier and ground and the rectified voltage obtained by rectification may be taken off between an output electrode 2 and ground. $C_o$ indicates a smoothing capacitor which is usually connected to the output electrode of the rectifier.

For a good understanding of the invention, an insight about the distribution of the alternating voltage along the rectifier is important. The diodes $d_0 \ldots d_N$, indicated in FIGURE 1, may be disregarded for determining said variation of the alternating voltage. However, the invention is based upon the recognition that not only the diode capacitances $C_s$ connected in series, but also the parasitic capacitances of the diodes relative to ground exert great influence on the variation of the alternating voltage despite the fact that said capacitances are very low (for example, 8M pf.). Said parasitic capacitances are indicated by $C_p$ in FIGURE 1.

It can be appreciated in a simple manner that, if the parasitic capacitances $C_p$ could be neglected, the alternating voltage along the rectifier, due to the substantially equal diode capacities $C_s$ connected in series, would show a linear variation from the value U at the input electrode 1 to the value 0 at the output electrode 2, so that the same voltage $U/N$ would appear across each semiconductor element. From a calculation in which the parasitic capacitances $C_p$ are also taken into account it follows, however, that for the alternating voltage variation $V(n)$ we have:

$$V(n)=U\frac{\sin hn\sqrt{C_p/C_s}}{\sin hN\sqrt{C_p/C_s}} \quad \text{(I)}$$

wherein $n$ indicates the rank number of each element, as reckoned from the output electrode 2.

If $N\sqrt{C_p/C_s}$ is small relative to unity, the two hyperbolic functions occurring in the above-mentioned expression may be replaced by the arguments so that then we have approximately:

$$V(n)=U\frac{n\sqrt{C_pC_s}}{N\sqrt{C_pC_s}}=U\,n/N \quad \text{(II)}$$

which expression indicates the above-mentioned linear variation of the alternating voltage. Said approximation is not valid, however, for the values of N, $C_s$ and $C_p$ which occur in practice with high voltage rectifiers, since for such rectifiers we may have, for example, $N=500$, $C_s=80$ pf., $C_p=8$M pf., so that $N\sqrt{C_p/C_s}=5$. Thus it is found that, despite the very low value of the parasitic capacitances (a factor of $10^4$ lower than $C_s$) these capacitances exert an influence on the voltage variation which cannot be neglected.

Figure 2:
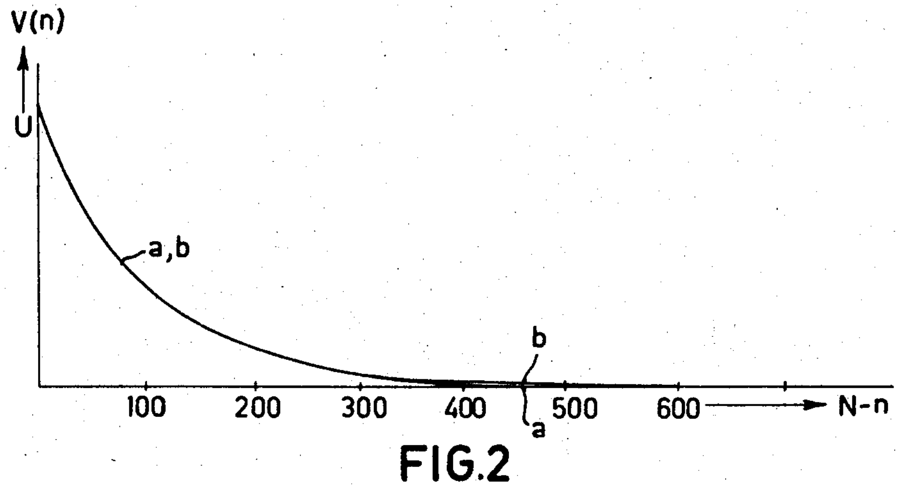
FIGURE 2 shows the voltage distribution in a known high voltage rectifier.

With the aid of the Expression I, the variation of the alternating voltage along the rectifier has been determined for the values specified and is shown by curve *a* in FIGURE 2. From this curve it clearly follows that a considerable portion of the voltage appears across the elements located near the input electrode (half of the voltage appears across 14% of the elements present) and that substantially no voltage drop occurs across the elements located near the output electrode. The voltage variation is not improved if the number of semiconductor elements in the rectifier is increased. This is shown by curve *b* in FIGURE 2, which illustrates the voltage variation for a similar rectifier stack where $C_s=80$ pf. and $C_p=8M$ pf., but for $N=600$.

Figure 3:
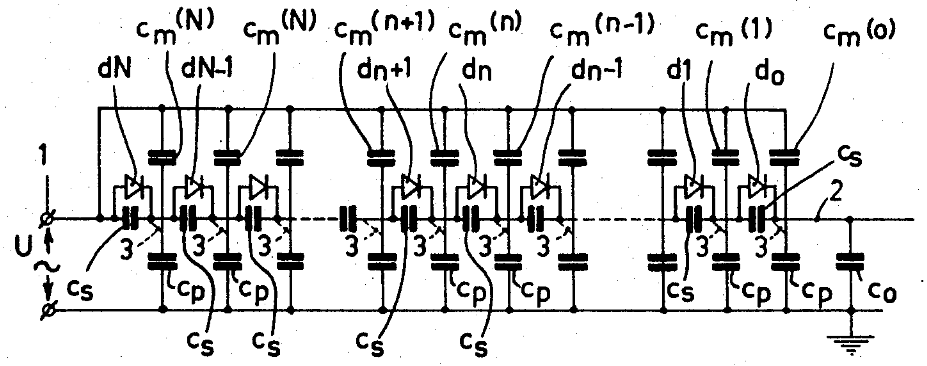
FIGURE 3 shows the equivalent diagram of a high voltage rectifier provided with a neutralizing conductor according to the invention.

With reference to the equivalent diagram shown in FIGURE 3, I will show how the influence of the parasitic capacitances on the voltage variation in the rectifier according to the invention can be eliminated. For this purpose each element is provided with a neutralizing capacitance which is connected, for example, to the alternating voltage U to be rectified, said neutralizing capacitances are indicated by $C_m$ in FIGURE 3.

It is possible in a simple manner to determine the magnitude of said neutralizing capacitances $C_m$ of optimum neutralization of the parasitic capacitances on the following line of thought. The connection between the neutralizing capacity $C_m$ and the parasitic capacitance $C_p$, on the one hand, and the series-combination of the diode capacitances $C_s$ on the other, as indicated by reference numeral 3 and shown in dashed line in FIGURE 3, is imagined to be loosened for each semiconductor element. The voltage variation along the diode capacitances now shows the desired linear variation, which is indicated by the expression:

$$V(n)=U\,n/N$$

If, now, the neutralizing capacitances $C_m$ are chosen so that the voltage at each common point of a neutralizing capacitance and a parasitic capacitance also has the value U $n$/N, the connections 3 can be re-established without producing a change of the voltage variation along the series-combination of the diode capacitances. The condition that each common point of a neutralizing capacitance and a parasitic capacity shall have the voltage U $n$/N is fulfilled if the neutralizing capacitances are so proportioned that we have:

$$C_m(n)=C_p\frac{n}{N-n} \qquad \text{(III)}$$

From the foregoing it follows that, if the condition (III) is fulfilled, the voltage across the rectifier varies linearly so that the same voltage drop appears across each semiconductor element. For this optimum neutralization the elements located near the input electrode must each be provided with a neutralizing capacitance which is great relative to $C_p$ and the elements located near the output electrode must each be provided with a neutralizing capacitance which is low relative to $C_p$. The neutralizing capacitances must be approximately of the same order of magnitude as the parasitic capacitances at the centre of the rectifier ($n=N/2$).

It is to be noted that it can similarly be calculated that, if the alternating voltage to be rectified is applied to the neutralizing capacitances with an amplitude which is a factor *a* greater than that of the lternating voltage applied to the input electrode 1, the neutralizing capacitances must, for optimum neutralization, satisfy the condition:

$$C_m(n)=C_p\frac{n}{aN-n} \qquad \text{(IIIa)}$$

In practice the step according to the invention may consist in providing a neutralizing conductor to which the alternating voltage to be rectified is applied and which is arranged and/or formed so that the capacitances between the semiconductor elements and the neutralizing conductor progressively decrease as the elements are located nearer to the side of the output electrode.

A simple embodiment is illustrated in FIGURE 4 which shows a high-voltage rectifier comprising semiconductor elements $d_n$, an input electrode 1, an output electrode 2, and an insulating layer 4. The rectifier also includes a high voltage cable of which the conductor connected to the input electrode 1 is active as a neutralizing conductor. Said cable extends as closely as possible along the rectifier through a portion of the rectifier located near the input electrode, whereas the distance between the cable and the rectifier increases towards the output electrode through the remaining portion of the rectifier. The neutralizing capacitances $C_m$ are constituted by the capacitances between the semiconductor elements and the neutralizing conductor.

A satisfactory linearization of the voltage variation in the rectifier may be obtained in the manner illustrated in FIGURE 4. Optimum linearization is not obtained, however, because, as appears from Equation III, optimum linearization requires that the neutralizing capacitances at the input electrode must be very large relative to the parasitic capacitances.

To satisfy the Equation III also for the elements located near the input electrode, it is not necessary for the neutralizing capacitances themselves to be made very great near the input electrode. Since the Equation III only imposes a requirement on the relationship between the neutralizing capacitance $C_m$ and the parasitic capacity $C_p$, the desired effect is also enhanced by the fact that, due to the shielding action of the neutralizing conductor, the parasitic capacitances of the elements relative to ground is lower as the capacitance between the elements and the neutralizing conductor is greater. In Equation III, and also in Equation IIIa, $C_p$ is thus dependent on $n$, as also is $C_m$.

FIGURE 5*a* shows an embodiment in which optimum linearization of the voltage variation in the rectifier is obtained. The insulating envelope of a rectifier 6 is covered with a conductive layer 7 (for example, metal or carbon), which substantially surrounds the rectifier near its input electrode, the portion of the insulating envelope covered by the layer 7 becoming smaller in the direction towards the output electrode. The neutralizing capacitances are greater and the parasitic capacitances relative to ground are lower as the conductive layer covers a larger portion of the rectifier.

From the foregoing it will be evident that the neutralizing conductor to be provided according to the invention may have a variety of forms and positions relative to the rectifier. As shown in FIG. 5*b* it is possible, for example, to have a rectifier with input and output electrodes 1 and 2 and an insulating layer 6, which, instead of being provided with a conductive layer as shown in FIG. 5*a*, is provided with a winding of wire 13 with a progressively increasing pitch in the direction towards the output electrode, said winding being connected to the input electrode 1.

According to a further aspect of the invention, it is possible to increase the thickness of the insulating layer progressing from the input electrode towards the output electrode, especially if the neutralizing conductor is provided directly on the insulating layer of the rectifier. Thus, not only an additional reduction of the neutralizing capacitances near the output electrode is obtained, but it is also achieved that the great potential difference between the neutralizing conductor and the semiconductor elements located near the output electrode is resisted better.

As a matter of fact, a rectifier which is neutralized, for example, as in the embodiment shown in FIGURE 4 or FIGURE 5, so that a linear voltage variation occurs across it on producing a positive direct voltage, cannot be employed in unvaried form for producing a negative direct voltage. According to a further aspect of the invention, in order to obtain a rectifier which is neutralized both for producing a positive and a negative direct voltage, the neutralizing conductor may be made detachable. By reversing the neutralizing conductor and connecting it to the other electrode, the rectifier may be made suitable for producing a direct voltage of opposite polarity.

A possible embodiment of a rectifier which permits of producing a positive as well as a negative direct voltage without the neutralizing conductor having to be made detachable is shown in FIGURE 6*a*.

Said figure shows a circuit in which the insulating layer of a high voltage rectifier 9 is substantially covered by a conductive layer 10 which is active as a neutralizing conductor. The alternating voltage to be rectified is supplied by a winding 11 of a transformer and applied to the input electrode 1 of the rectifier. The alternating voltage to be rectified is likewise applied to the neutralizing conductor 10, but with an amplitude which is about half the amplitude of the voltage applied to the input electrode. The alternating voltage for the neutralizing conductor may be obtained from a tap 12 on the winding of the transformer. It is also possible to derive said voltage from the input electrode 1 through a capacitor of a suitable capacitance.

In the embodiment shown in FIGURE 6*a*, optimum linearization of the voltage variation across the rectifier is not achieved, but a considerable improvement nevertheless is obtained compared to a rectifier in which no neutralization is used. In FIGURE 6*b*, curve I illustrates the voltage variation across a rectifier which is not neutralized and curve II illustrates the voltage variation with a neutralization as shown in FIGURE 6*a*.

What is claimed is:

1. A high voltage rectifier comprising an input electrode connected to one terminal of a source of alternating voltage to be rectified, an output electrode for supplying a direct voltage to a load, a plurality of semiconductor rectifying junction elements serially connected between said input and output electrodes, a conductor connected to a second terminal of said voltage source, each of said rectifying elements having a distributed parasitic capacitance relative to said conductor, a neutralizing conductor arranged in the vicinity of said rectifying elements to form therewith a plurality of distributed neutralizing capacitances which vary in a non-linear manner for different ones of said rectifying elements, an insulation layer separating said rectifying elements from said neutralizing conductor, said neutralizing conductor comprising a layer of conductive material which partially covers said insulation layer and is arranged so as to shield said rectifying elements from the effects of said parasitic capacitances, said conductive layer being arranged so that the area of coverage is greatest near the input electrode and decreases towards the output electrode thereby simultaneously to produce a non-linear decreasing variation in said neutralizing capacitances from the input to the output electrode and a variation in said parasitic capacitances from the input to the output electrode approximately inverse thereto, and means for coupling said one terminal of the alternating voltage source to said neutralizing conductor so that said neutralizing conductor is the only means for neutralizing said parasitic capacitances.

2. A rectifier as described in claim 1 wherein the thickness of said insulation layer increases from the input electrode towards the output electrode.

3. A high voltage rectifier comprising an input electrode connected to one terminal of a source of alternating voltage to be rectified, an output electrode for supplying a direct voltage to a load, a plurality of semiconductor rectifying junction elements serially connected between said input and output electrodes, a conductor connected to a second terminal of said voltage source, each of said rectifying elements having a distributed parasitic capacitance relative to said conductor, a neutralizing conductor arranged in the vicinity of said rectifying elements to form therewith a plurality of distributed neutralizing capacitances which vary in a non-linear manner for different ones of said rectifying elements, an insulation layer covering said rectifying elements, said neutralizing conductor comprising a wire conductor wound about said insulation layer with a progressively increasing pitch from the input electrode towards the output electrode, and means for coupling said one terminal of the alternating voltage source to said neutralizing conductor so that said neutralizing conductor is the only means for neutralizing said parasitic capacitances.

4. A rectifier as described in claim 3 wherein the thickness of said insulation layer increases from the input electrode towards the output electrode.

5. A high voltage unitary semiconductor rectifier structure comprising a plurality of semiconductor rectifying elements affixed to one another in series circuit relationship, an input electrode for said rectifier connected to a source of alternating voltage to be rectified, an output electrode for said rectifier arranged to supply a direct voltage to a load, each of said rectifying elements having a given value of parasitic capacitance relative to ground, a neutralizing conductor electrically connected to said input electrode and comprising a layer of conductive material which partially surrounds said rectifying elements such that the area of coverage is greatest near the input electrode and decreases towards the output electrode, said neutralizing conductor forming a distributed neutralizing capacitance with said rectifying elements which varies in a non-linear manner between the input and output electrodes, said neutralizing conductor being interposed between said rectifying elements and ground so as to act as a variable shielding means extending between the input and output electrodes such that the parasitic capacitances for the rectifying elements closest to the input electrode are smaller than the parasitic capacitances of the rectifying elements which are near the output electrode.

6. A high voltage rectifier comprising an input electrode connected to one terminal of a source of alternating voltage to be rectified, an output electrode for supplying a direct voltage to a load, a plurality of semiconductor rectifying junction elements serially connected between said input and output electrodes, a grounded conductor connected to a second terminal of said voltage source, each of said rectifying elements having a distributed parasitic capacitance relative to said conductor, a neutralizing conductor arranged in the vicinity of said rectifying elements to form therewith a plurality of distributed neutralizing capacitances which vary in a non-linear manner for different ones of said rectifying elements, said neutralizing conductor comprising a sheath of conductive material interposed between said rectifying elements and ground and arranged to surround said rectifying elements such that the area of coverage decreases from the input to the output electrode, thereby to at least partially shield said elements from the effects of the distributed capacitances to ground, and means for coupling said one terminal of the alternating voltage source to said neutralizing conductor so that said neutralizing conductor is the only means for neutralizing said parasitic capacitances.

7. A rectifier assembly comprising a plurality of rectifier elements assembled in series to form a single rectifier unit, a first terminal connected to one end of said rectifier unit and a second terminal connected to the other end of said rectifier unit, a conducting member having one end connected to said one end and disposed about said unit in a coil to provide decreasing capacitive coupling to said elements in a direction from said first terminal toward said second terminal.

8. A rectifier assembly comprising a plurality of rectifier elements assembled to form a stack that comprises a single rectifier unit having an anode at one end of said stack and a cathode at another end of said stack, a first terminal connected to the anode end of said stack and a second terminal connected to the cathode end of said stack, and a conducting member connected to said first terminal and disposed about said stack in a coil to provide decreasing capacitive coupling with said elements in a direction toward said second terminal.

9. A rectifier assembly comprising a plurality of rectifier elements assembled to form a stack that comprises a single rectifier unit, a first terminal connected to one side of said stack and a second terminal connected to the other side of said stack, and a length of wire having one end connected to said first terminal and disposed about at least a portion of said stack in a coil, the pitch of which increases toward said second terminal.

References Cited

UNITED STATES PATENTS

| | | | |
|---|---|---|---|
| 3,123,760 | 3/1964 | Wouk et al. | 321—11 |
| 3,128,421 | 4/1964 | Skellett | 321—11 |
| 3,242,412 | 3/1966 | Diebold | 321—11 |
| 3,278,826 | 11/1966 | Walker | 321—11 X |

FOREIGN PATENTS

| | | |
|---|---|---|
| 1,064,642 | 3/1960 | Germany. |

JOHN F. COUCH, *Primary Examiner.*

W. H. BEHA, Jr., *Assistant Examiner.*

U.S. Cl. X.R.

317—234; 321—27